United States Patent [19]

Doran

[11] 4,223,252
[45] Sep. 16, 1980

[54] COLOR SWITCHING DISPLAY SYSTEM

[75] Inventor: Robert W. Doran, Acton, Mass.

[73] Assignee: Raytheon Company, Lexington, Mass.

[21] Appl. No.: 36,930

[22] Filed: May 7, 1979

[51] Int. Cl.³ ............................................. H01J 29/80
[52] U.S. Cl. .................... 315/375; 315/371; 358/73
[58] Field of Search .................. 315/375, 382, 371; 358/73; 313/450, 473

[56] References Cited

U.S. PATENT DOCUMENTS

| Re. 28631 | 11/1975 | Waehner et al. | 315/371 |
|---|---|---|---|
| 3,961,223 | 6/1976 | Ray et al. | 315/382 |
| 4,092,566 | 5/1978 | Chambers et al. | 315/375 |
| 4,099,088 | 7/1978 | Hart | 313/450 |
| 4,104,566 | 8/1978 | Shah | 315/371 |

Primary Examiner—Theodore M. Blum
Attorney, Agent, or Firm—M. D. Bartlett; J. D. Pannone; H. W. Arnold

[57] ABSTRACT

A deflection amplifier gain correction circuit for a beam penetration color cathode ray tube having a split high voltage anode in which the deflection waveform is shaped as a non-linear function of the final anode voltage and as a function of a dynamic focus waveform used for the electrostatic focussing system in the cathode ray tube. The shape of the correcting waveform is adjusted by adjusting the amounts of the dynamic focus waveform and the anode switching voltage waveform which are multiplied to produce a resulting waveform which varies as a function of deflection position and anode voltage and is summed with a waveform which is a non-linear function of anode voltage. Such a system can be adjusted for each individual display unit to compensate for production variations in a color penetration tube using two different colored phosphors. By producing such registration for beams having different anode voltages, various mixes of colors can be produced to form, for example, four distinct colors on a display from two phosphors with color impurity being reduced by reduction in misregistration of different colors at the edges of the cathode ray tube screen.

10 Claims, 2 Drawing Figures

COLOR SWITCHING DISPLAY SYSTEM

BACKGROUND OF THE INVENTION

Color penetration cathode ray tube systems have been used for displays where high resolution is desired, an example being given in U.S. Pat. No. 4,099,088 issued Jan. 4, 1978, to H. M. Hart in which the shifting between colors is achieved by varying the cathode to anode voltage at the phosphor screen. The switching time from color to color can be reduced by reducing the portion of the anode whose voltage is changed while retaining large portions of the post deflection anode structure at substantially constant voltage.

When such structures are used in large cathode ray tubes having substantially flat face plates, correction must be made for the focus if sharp spot size and registry of spots or different electron velocity beams is to be maintained. Otherwise, misregistry of beams of different velocities produced by different anode voltages causes current impurity or misregistry of colors in an objectionable manner in peripheral regions of the cathode ray tube screen.

SUMMARY OF THE INVENTION

This invention discloses the discovery that factors contributing to such misregistration and/or misfocussing is the fact that the electron beam travels different distances from the focussing anode to the screen for different distances of the point of impingement on the screen from the center of the screen and the fringing electrostatic fields in the post deflection region of the tube between the two sections of the high voltage anode. These sections are at different relative potentials for different colors being produced on the screen thereby causing different degrees of electrostatic deflection of the beam particularly in the regions of the periphery of the display screen. Since the fringing electrostatic field and the distance from the source to the screen require non-linear corrections of the deflection amplifiers, conventional correction systems have not produced good results.

This is particularly true in multi-color display applications where different colors are used to indicate different graphic symbols in the same general location, and any distortion in the deflection of the electron beam for different colors becomes apparent if the different colors are used to represent, for example, different targets on a radar or sonar screen or if one color represents fixed range marks. Thus, relative distortion for different colors should be corrected to substantially less than 1 percent at the edges of the display and must approximate a few thousandths of an inch or a fraction of the beam diameter. In addition, in those cases where the face plate of the cathode ray tube is substantially flat, additional correction for the standard pincushion correction is desired to ensure that the over all deflection non-linearity is less than 1 percent. Because the amount of correction varies within the production tolerances of the cathode ray tube, an adjustable correction of the deflection waveform is desirable.

In accordance with this invention, a digital cathode ray tube display is provided with an adjustable circuit for compensating deflection amplification of a cathode ray tube by varying said amplification as a non-linear function of beam deflection and as a non-linear function of variation in cathode to anode voltage. More specifically, this invention provides for supplying a wave power component which varies as a function of the square of the magnitude of the deflection of the electron beam from the center of the screen of a cathode ray tube and as a non-linear function of the fluorescent screen voltage variations. In accordance with this invention, this waveform is summed with a waveform having a component varying as a linear function of changes in the flourescent screen voltage and as a non-linear function thereof. A composite beam deflection correction waveform is produced whose shape may be altered by adjusting the relative amount of the linear and non-linear components used to produce the deflection waveform.

Preferably a high voltage sample is derived from that section of the high voltage anode system which is connected to the terminal supplying the voltage to the fluorescent screen. This signal is processed in a sample processor to produce a signal component which varies in amplitude as a direct non-linear function of the difference in potential between the two sections of the high voltage anode system multiplied by a signal which is derived from the dynamic focus signal and which varies as the square of the deflection of the beam from the center of the screen. This signal is summed with a signal formed by multiplying the inverse of the high voltage sample to its square. The signal is then multiplied with the beam deflection signal to produce a waveform which drives the magnetic deflection system of the cathode ray tube.

BRIEF DESCRIPTION OF THE DRAWINGS

Other and further objects and advantages of the invention will become apparent as the description thereof progresses, reference being had to the accompanying drawings wherein.

DESCRIPTION OF THE PREFERRED EMBODIMENT

Figure 1:
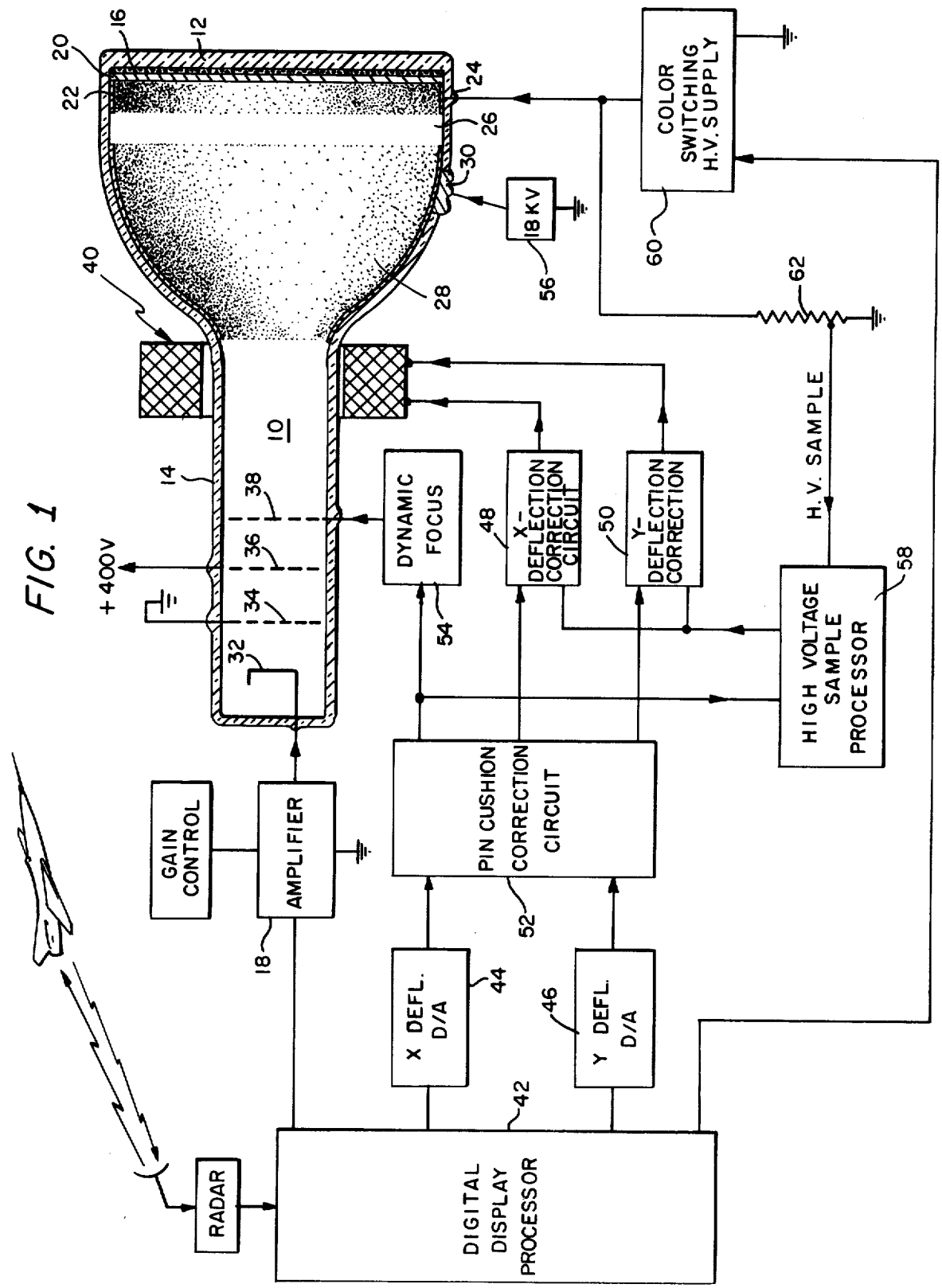
FIG. 1 illustrates a functional flow diagram of a color penetration phosphor screen cathode ray tube display system embodying the invention.

Referring now to FIG. 1, there is shown a cathode ray tube 10 having a substantially flat face plate 12 forming part of the envelope 14 of tube 10. The envelope 14 is preferably formed of glass having a bell-shaped portion connected to face plate 12 and a neck portion containing an electron gun and attached to the bell portion. The inner surface of face plate 12 has a layer 16 formed of a mixture of red and green phosphors and a layer 20 of reflective, conductive material such as a thin layer of aluminum. The green phosphor grains are coated with a layer which requires a higher velocity electron to penetrate and activate the green phosphor than electrons which penetrate and activate the red phosphor so that by switching the voltage between the electron gun and the aluminum screen 20, different colors may be produced for viewing through face plate 12. An example of such a system is shown in U.S. Pat. No. 4,099,088 issued July 4, 1978 to H. M. Hart. However, different layers of phosphors or other expedients may be used to produce different colors from the fluorescent layer when excited by different electron velocities.

A ring region 22 of conductive material, such as aquadag, is deposited on the bell-shaped portion of the envelope 14 adjacent to the face plate 12. Ring region 22 preferably contacts conductive layer 20 and contacts a terminal 24 extending through the envelope 14. A second ring region 26 on the inside of the envelope 14 adjacent to ring 22 is not coated with conductive material and electrically isolates ring region 22 from a conductive coating 28 which substantially covers the remainder of the inner surface of the bell portion of envelope 14. Layer 28 is connected to a second terminal 30 extending through the envelope 14.

An electron gun, which is positioned in the neck of the tube 10, consists of a cathode 32, a control electrode 34, an accelerating electrode 36, and a focus electrode 38 in accordance with well-known practice. A magnetic deflection system 40 comprising conventional horizontal and vertical deflection coils is positioned around the neck of the envelope 14 adjacent the bell portion thereof.

In accordance with this invention a display processor 42 provides data signals to an amplifier 18 which drives cathode 32 to intensity modulate the presentation on the screen 16. The display processor 42 also supplies deflection signals for X and Y deflection of the electron beam through digital to analog converters 44 and 46 respectively which drive a pincushion correction circuit 52.

Circuit 52 produces a signal which is the square root of the sum of the squares of the X and Y deflection signals and which is supplied to control a variable power supply 54 whose output is connected to focus electrode 38.

In accordance with this invention circuit 52 supplies pincushion corrected X and Y deflection signals through X and Y deflection correction circuits 48 and 50 respectively to the horizontal and vertical deflection coils of deflection system 40. A second correction signal which is a non-linear function of changes in the voltage applied to terminal 24 and the voltage applied to focus electrode 38 is applied to second inputs of circuits 48 and 50. The terminal 30 is maintained at a constant voltage of, for example, 18 kilovolts by power supply 56 while the terminal 24 is shifted in steps to produce substantially red color at 10 kilovolts, substantially orange color at 12 kilovolts, substantially yellow color at 14 kilovolts, and substantially green color at 18 kilovolts. This occurs since the red phosphor grains are not coated and respond to electron velocities produced by a screen voltage of 10 KV while the green phosphor particles are coated with a layer which requires higher electron velocities to penetrate. When the screen is at 18 KV, the brightness of the green phosphor light overrides the red phosphor light. Intermediate colors are mixtures or red and green produced by screen voltages between 10 KV and 18 KV. The voltage applied to terminal 24 is supplied from a four-level digitally controlled color switching power supply 60 in accordance with an output data from display processor 42.

A signal representative of the voltage supplied by power supply 60 to terminal 24 is supplied to a high voltage sample processor 58 through voltage divider circuit 62. Processor 58 is also supplied with the same signal that is supplied to dynamic focus supply 54. Processor 58 converts the signal from power supply 60 to a non-linear signal by a squaring process and combines a portion of this signal with a portion of the unsquared signal from circuit 62 and with a portion of the signal supplied to dynamic focus 54 to form an output which is supplied to the second inputs of the circuits 48 and 50.

In operation, the signal from color switching power supply is divided by circuit 62 by about 2400 and produces a sample voltage varying between approximately 4.2 volts and 7.7 volts corresponding to color switching voltages between 10 kilovolts and 18.5 kilovolts. The correction supplied to the deflection coil system 40 through the circuits 48 and 50 corrects primarily for the electrostatic deflecting field produced between conductive coating rings 22 and 28 when the voltages between the rings are substantial, such as several thousand volts. This effect has been discovered to be most pronounced near the edges of the face plate and to vary non-linearly with the voltage between regions 22 and 28 and non-linearly with the magnitude of deflection of the beam. In accordance with this invention, an adjustable non-linear correction signal has been found to correct this deflection for this effect. Such a deflection correction is an addition to the correction for pincushion effect provided by the circuit 52 which compensates for the fact that the cathode 32 is different distances from different portions of the fluorescent screen in accordance with well-known practice.

Figure 2:
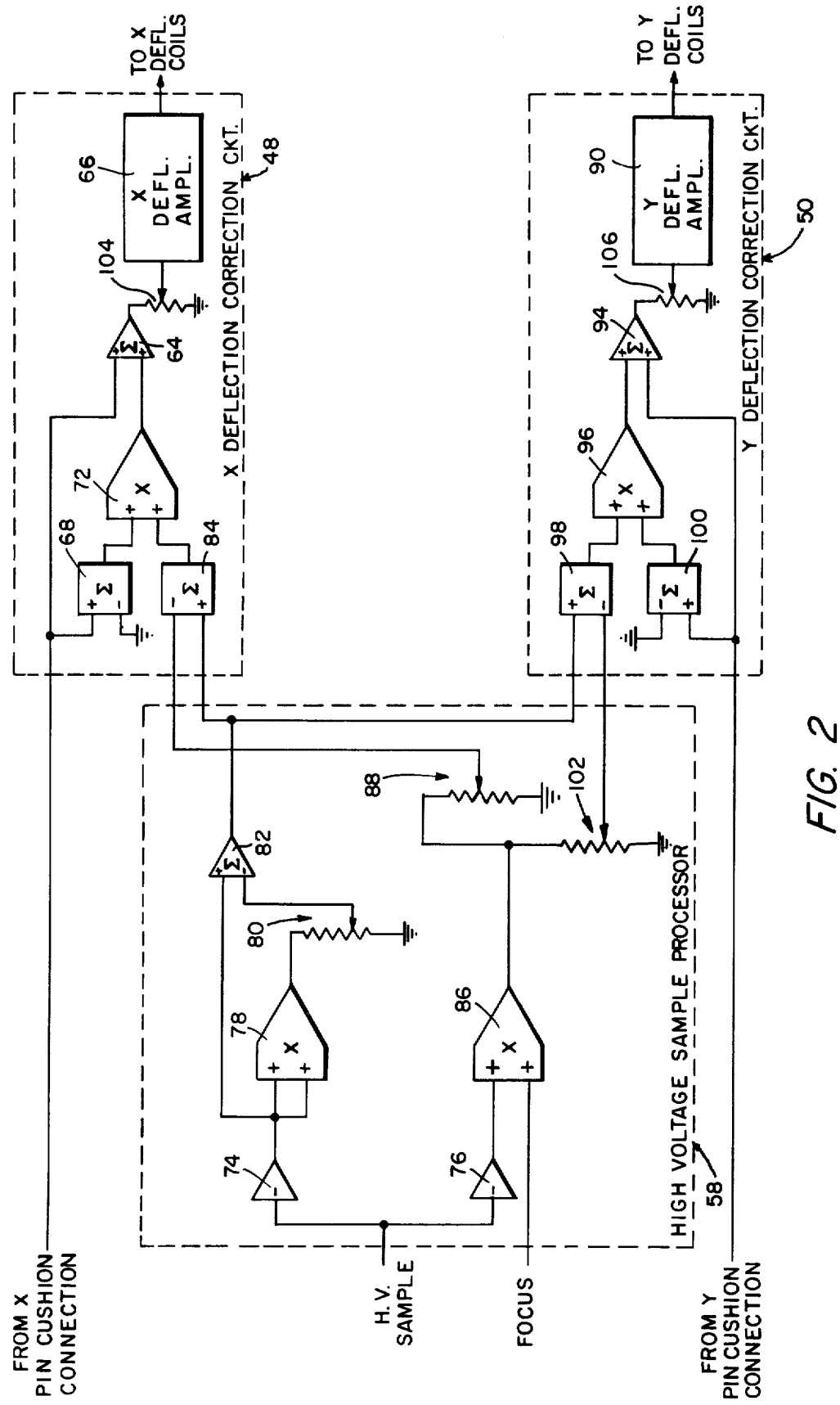
FIG. 2 illustrates a detailed embodiment of deflection correction circuitry which may be used in the system of FIG. 1.

Referring now to FIG. 2 there is shown an example of a deflection correction circuit which may be used with the invention shown in FIG. 1. The X deflection signal from the pincushion correction circuit 52 is supplied directly to one input of a summing amplifier 64 as well as directly to one input of a summing amplifier 68 whose other input is grounded. The output of summing amplifier 68 feeds one input of a multiplier 72 whose output is supplied to a second input of summing amplifier 64.

The high voltage sample from the switching power supply 60 of FIG. 1 obtained from a voltage divider 62 is supplied to two inverting amplifiers 74 and 76 respectively. The output of amplifier 74 is supplied to two inputs of a multipler 78 so that the output signal is proportional to the square of the input signal. The output of multiplier 78 is fed through a variable potentiometer 80 to one input of a summing amplifier 82. The other input of summing amplifier 82 is fed directly from amplifier 74 and the output of summing amplifier 82 is fed to one terminal of a summing amplifier 84 whose output is supplied to the other terminal of multiplier 72 from that supplied by summing amplifier 68.

The output of amplifier 76 is fed to one input of a multiplier 86 while the other input to multiplier 86 is supplied with a signal from the same output of pincushion correction circuit 52 which feeds the dynamic focus supply 54 of FIG. 1, and which preferably is a signal whose amplitude varies directly with the amount of deflection of the electron beam from the center of the cathode ray tube face plate. The output of multiplier 86, therefore, is a signal whose amplitude varies substantially directly with the voltage applied to high voltage terminal 24 and with the voltage applied to the dynamic focus. The output of multiplier 86 is supplied to a potentiometer 88 having a variable tap feeding a selected portion of the output signal from multiplier 86 to the opposite input terminal of summing amplifier 84 from that connected to the summing amplifer 82.

The Y deflection signal from pincushion correction circuit 52 supplies a circuit similar to the X deflection circuit in which a summing amplifier 94 has one input supplied by circuit 52 and a second input supplied from a multiplier 96. Two summing amplifiers 98 and 100, which feed the two inputs of multiplier 96, are connected in similar fashion to summing networks 84 and 68. Specifically, summing network 98 has one input supplied from the output of summing amplifier 82 and the other input supplied from a variable tap on potentiometer 102 which is fed from the output of multiplier 86. Summing network 100 has one input grounded and the other input supplied from the Y deflection signal output from circuit 52. Preferably, potentiometers 104 and 106 are connected to the outputs of summing amplifiers 64 and 94. The taps on the potentiometers respectively supply X and Y deflection coil amplifiers 66 and 90 which drive the X and Y deflection coils of deflection system 40.

Components 66, 84, 72, 64, 104 and 68 make up the X deflection correction circuit 48 of FIG. 1. Components 74, 76, 78, 80, 82, 86, 88 and 102 make up the high voltage sample processor 58. Components 90, 106, 94, 96, 98 and 100 make up the Y deflection correction circuit 50.

It should be clearly understood that the components described herein may be any well-known type using conventional assembly techniques. The amplifiers used are preferably differential amplifiers which are made inverting by connecting the input to the negative terminal and grounding the other terminal in accordance with well-known practice. The multipliers 78 and 86 may be standard parts such as an AD532, and the multipliers 72 and 96 may be, for example, a standard part AD534 which includes summing amplifiers 68, 84, or 98 and 100 connected to the inputs. The pincushion correction circuit is a conventional circuit used with electrostatic focus cathode ray tubes to provide both pincushion correction and dynamic focus. However, other types of pincushion correction circuits could be used if desired.

In operation, a signal supplied from the high voltage sample circuit to the amplifiers 74 and 76 is inverted in amplifier 76 so that as the high voltage applied to the screen is reduced, the output of amplifier 74 is increased. The output of the amplifier 76 preferably has a fixed DC bias so that the input to the multiplier 78 is zero when the two anode sectors 22 and 28 are at equal potential. The output of amplifier is multiplied by the dynamic focus voltage and fed to the potentiometers 88 and 102 so that amplitudes thereof may be adjusted before supplying them to the deflection correction circuits.

The output of the multiplier 78, which is the square of the inverted signal from amplifier 74, and hence positive, is preferably added to the output of the amplifier 74 by a summing resistive network in summing amplifier 82. This signal is then inverted in amplifier 82 to produce a signal which varies in the same direction as the high voltage sample in a non-linear fashion.

It has been found that such a high voltage sample processor circuit produces waveform components whose amplitude may be adjusted and then used for multiplication with the X and Y deflection signals to produce corrected deflection waveforms which counteract the increase in beam deflection produced by the electrostatic field between the two sections 22 and 28 of the split anode. This electrostatic field substantially increases the deflection of the beam in regions adjacent the edges of the screen and such deflection increase varies as a non-linear function of the deflection voltage and the voltage difference between the sections. Accordingly, since the amount of such deflection increase varies due to production tolerances of the cathode ray tube and other circuit parameters, adjustments must be made after the tube has been installed in the display system, particularly if the different colors produced by the different anode voltages are to produce a display in the edge region of the tube which accurately register the different colored marks with respect to each other.

This completes the embodiment of the invention disclosed herein. However, many modifications thereof will be apparent to persons of ordinary skill in the art. For example, signals representing the various components of the composite deflection correction circuit could be generated digitally and their outputs converted to analog signals which are adjustably summed. Other forms of cathode ray tube displays having other types of electron guns and focus circuits which are either electrostatic or magnetic could be used, and other types of analog integrated circuits could be used. Accordingly, it is intended that this invention be not limited by the details of the embodiment disclosed herein accept as defined by the appended claims.

What is claimed is:

1. A cathode ray tube display system comprising:
   a cathode ray tube having a substantially flat face plate;
   a plurality of colors of fluorescent material deposited thereon which are responsive to different velocities of the electron beam;
   means for producing different colors from fluorescent material supported on said face plate comprising means for producing different high voltages between said fluorescent material on said face plate and a source of electrons for said electron beams;
   means for deflecting said beam;
   means for energizing said deflecting means with a waveform having a component derived from said high voltages and having a component which varies as a linear function of the desired position of said beam and which varies as a non-linear function of the magnitude of said deflection.

2. A digitally controlled multi-color phosphor penetration responsive cathode ray tube display comprising:
   means for producing a cathode ray tube having deflection means;
   a digital display controller providing output data from a digital memory;
   means for converting said deflection data to analog deflection signals; and
   means for deriving a deflection waveform compensating for different distances of said electron source from different regions of a fluorescent screen of the cathode ray tube and means supplied with a signal derived from a source of potential for compensating for variations in the changes in said potential between the electron source and the fluorescent screen of said cathode ray tube.

3. A cathode ray tube color display system comprising:
   a cathode ray tube having a substantially flat face plate and a bell-shaped tube portion;
   means for producing different colors from different phosphors supported on said face plate comprising means for producing different voltages between said face plate and an electrode in said bell-shaped portion of said tube;
   means for deflecting the electron beam of said tube comprising magnetic deflection coils; and
   means for energizing said deflection coils with a waveform which comprises a linear function of the desired position of said beam, a non-linear function of the magnitude of the deflection of said beam, and a non-linear function of a voltage derived from the potential between the electron source of said beam and said electrode.

4. A digitally controlled multi-color phosphor penetration responsive cathode ray tube display comprising:
a cathode ray tube comprising a multi-color fluorescent screen, an electron gun and a two-section final anode;
a digital display controller providing output color and location data from a digital memory;
means for converting said location data to analog signals; and
means for correcting the magnitude of said analog location signals comprising means for compensating for different distances of said electron source from different regions of said fluorescent screen and means for compensating for different potentials between said two-sections of said final anode in response to a voltage derived from the changes in potential supplied to one section of said final anode.

5. A cathode ray tube display system comprising:
a cathode ray tube comprising a substantially flat face plate, an electron beam forming gun, a multi-section final anode, and a plurality of colors of fluorescent material which are supported on said face plate and which are responsive to different velocities of the electrons from said gun;
means for producing different colors from said face plate changing said velocities comprising means for changing the voltage between fluorescent material and the source of electrons in said electron gun;
means for varying the focus of electrons from said gun on said face plate as a function of the deflection of said beam from the center of said face plate;
means for deflecting said beam comprising magnetic deflection coils;
means for energizing said deflecting means with an electrical waveform which comprises components including a substantially linear function of the displacement of said beam from said center, a non-linear function of the magnitude of said deflection, and a non-linear function of the potential between the source of said electrons and said fluorescent screen; and
means for adjusting the relative amplitude of said components.

6. In combination:
a cathode ray tube comprising an electron source and a high voltage anode system comprising two high voltage anode sections;
a magnetic deflection system for deflecting the path of a beam of electrons from said source;
a deflection correction system supplied with deflection signals and supplying driving waveforms to said deflection system; and
said deflection correction system comprising a plurality of analog multipliers supplied with an input derived from the potential applied to the high voltage anode section adjacent the fluorescent screen of said cathode ray tube and supplying signals to X and Y deflection correction circuits for producing outputs to said deflection coils which are non-linear functions of the potential difference between the high voltage anode sections.

7. In combination:
a cathode ray tube comprising an electron source and a plurality of different colored phosphors supported on a substantially flat face plate;
a high voltage anode system comprising two anode sections, the first of said anode sections being supplied from a voltage switching power supply for changing the color of said fluorescent screen and the second of said anode sections being supplied from a constant high voltage supply;
a magnetic deflection system supplied with deflection signals and supplying magnetic deflection coils for deflecting a beam of electrons from said source; and
said deflection system comprising a plurality of analog multipliers supplied with an input derived from the potential applied to said first high voltage anode section and supplying signals to X and Y deflection correction circuits for producing outputs to said deflection coils which are non-linear functions of the potential difference between the high voltage anode sections.

8. In combination:
a cathode ray tube comprising an electron gun and a screen comprising a plurality of different colored phosphors which are supported on a face plate and which produce different colors in response to different potentials between the electron source in said gun and said screen;
a high voltage anode system comprising first and second anode sections;
a deflection system supplied with deflection signals and supplying magnetic deflection coils positioned between said electron gun and said anode sections; and
said deflection system comprising a plurality of analog multipliers supplied with an input derived from the potential applied through said first high voltage anode section to said screen and supplying deflection correction circuits which produce output waveforms to said deflection coils which are non-linear functions of the potential difference between the high voltage anode sections.

9. The combination in accordance with claim 8 wherein:
said cathode ray tube comprises an electron gun having an electrostatic focus electrode supplied with a potential which varies as a non-linear function of the beam deflection.

10. The combination in accordance with claim 8 wherein:
said deflection system comprises means for producing output waveforms having components which are non-linear functions of the potential difference between the high voltage anode section and non-linear functions of the deflection of the cathode ray tube beam from the center of the screen.

* * * * *